(12) United States Patent
Wang et al.

(10) Patent No.: US 10,571,285 B2
(45) Date of Patent: Feb. 25, 2020

(54) VEHICLE ROUTE CONTROL

(71) Applicant: Ford Global Technologies, LLC, Dearborn, MI (US)

(72) Inventors: Bo Wang, Dearborn, MI (US); Jiaqi Ma, Dearborn, MI (US); Yimin Liu, Ann Arbor, MI (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 15/488,976

(22) Filed: Apr. 17, 2017

(65) Prior Publication Data

US 2018/0299283 A1 Oct. 18, 2018

(51) Int. Cl.
*G01C 21/34* (2006.01)
*G01C 21/36* (2006.01)
*G08G 1/0965* (2006.01)
*G08G 1/0967* (2006.01)
*G08G 1/0968* (2006.01)

(52) U.S. Cl.
CPC ..... *G01C 21/3415* (2013.01); *G01C 21/3492* (2013.01); *G01C 21/3691* (2013.01); *G08G 1/0965* (2013.01); *G08G 1/096708* (2013.01); *G08G 1/096725* (2013.01); *G08G 1/096791* (2013.01); *G08G 1/096805* (2013.01); *G08G 1/096811* (2013.01); *G08G 1/096844* (2013.01)

(58) Field of Classification Search
CPC ............ G01C 21/3415; G01C 21/3492; G01C 21/3691; G08G 1/096791; G08G 1/096805; G08G 1/096844; G08G 1/096811; G08G 1/096708; G08G 1/0965; G08G 1/096725
See application file for complete search history.

(56) References Cited

U.S. PATENT DOCUMENTS

| | | | | |
|---|---|---|---|---|
| 6,792,351 | B2* | 9/2004 | Lutter | G08G 1/0965 701/418 |
| 7,661,200 | B2* | 2/2010 | Bonnet et al. | A61B 5/1116 33/512 |
| 7,983,450 | B2* | 7/2011 | Higgins | G05D 1/0083 382/103 |
| 9,261,882 | B2 | 2/2016 | Kim et al. | |
| 9,278,689 | B1 | 3/2016 | Delp | |
| 9,459,620 | B1* | 10/2016 | Schaffalitzky | G05D 1/0016 |
| 9,805,601 | B1* | 10/2017 | Fields et al. | G08G 1/096791 |
| 9,832,241 | B1* | 11/2017 | Hayward | G08G 1/096844 |
| 2010/0188265 | A1* | 7/2010 | Hill et al. | G08G 1/096791 340/905 |
| 2015/0224891 | A1 | 8/2015 | Petrosian et al. | |
| 2016/0144867 | A1 | 5/2016 | Delp et al. | |
| 2016/0169688 | A1 | 6/2016 | Kweon et al. | |

(Continued)

*Primary Examiner* — Dale W Hilgendorf
(74) *Attorney, Agent, or Firm* — Michael Spenner; Brooks Kushman, P.C.

(57) ABSTRACT

An apparatus includes a processor configured to send detour instructions defining a travel path that avoids a location of the traffic event. The detour instructions may be sent responsive to receiving notification of a traffic event. The processor is further configured to update the detour instructions to alter the travel path based on the proposed vehicle routes such that autonomous vehicles operate to follow the altered travel path. The update may be responsive to proposed vehicle routes different than the travel path received from vehicles in a vicinity of the location.

13 Claims, 5 Drawing Sheets

(56) References Cited

U.S. PATENT DOCUMENTS

2017/0084175 A1\* 3/2017 Sedlik et al. .... G08G 1/096811
2017/0184409 A1\* 6/2017 Glasgow et al. ............................
                                                G08G 1/096844
2018/0126985 A1\* 5/2018 Lee et al. ............... G08G 1/166

\* cited by examiner

VEHICLE ROUTE CONTROL

TECHNICAL FIELD

This disclosure relates to route control for vehicles.

BACKGROUND

Events may require vehicles to slow down, change lanes, or avoid a location altogether. Traffic control officers may direct traffic using visual or aural commands, requiring vehicles to change course. Drivers of vehicles and autonomous vehicles may be unable to recognize or follow commands given by a traffic officer. Additionally, the commands may impede travel plans.

SUMMARY

An apparatus includes a processor configured to send detour instructions defining a travel path that avoids a location of the traffic event. The detour instructions may be sent responsive to receiving notification of a traffic event. The processor is further configured to update the detour instructions to alter the travel path based on the proposed vehicle routes such that autonomous vehicles operate to follow the altered travel path. The update may be responsive to proposed vehicle routes different than the travel path received from vehicles in a vicinity of the location.

A method by a processor of an apparatus includes sending detour instructions defining a travel path that avoids a location of the traffic event. The detour instructions may be sent responsive to receiving notification of a traffic event. The method further includes updating the detour instructions to alter the travel path based on the proposed vehicle routes such that autonomous vehicles operate to follow the altered travel path. The update may be responsive to proposed vehicle routes different than the travel path received from vehicles in a vicinity of the location.

A method by a processor of an apparatus includes sending detour instructions defining a travel path that avoids a location of the traffic event. The detour instructions may be sent responsive to receiving notification of a traffic event. The method further includes updating the detour instructions to alter the travel path based on the proposed vehicle routes such that autonomous vehicles operate to follow the altered travel path. The update may be responsive to proposed vehicle routes different than the travel path received from vehicles in a vicinity of the location. The method further includes establishing an audible connection between the responder and the vehicles.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As connectivity and autonomous vehicles begin to reshape transportation, common event responses may be redefined. For example, drivers of vehicles responded to roadway events by observing visual or aural cues. Such cues were often provided by traffic control officers or event responders. The vehicle's path was adjusted in response to the event, or the location of the event was avoided altogether at the direction of the event responder. For example, the vehicle may be instructed to change lanes, slow down, or change course. Instead of relying on visual or aural cues, vehicles unable to see or hear the event responders may receive an indication of the event or cues via wireless communications. For example, intelligent recognition of the cues may allow an event responder to maintain standard event response procedures that are subsequently communicated to the vehicles.

In some circumstances, passengers may be dissatisfied with the cues received. For example, the vehicle may be instructed by the event responder to alter the travel path in an inefficient manner. In such a case, passengers may prefer to take a different route. A new route is proposed by the passengers. The proposed route is then sent to an apparatus configured to receive the route information. The apparatus may determine whether the preferred route is different than the travel path received from vehicles near the event. Instead of continuing to send vehicles the rejected route, the apparatus may use machine learning to recognize that the proposed route is more desirable and send a route update. Meaning, the apparatus may begin to send the proposed route, or manifestation thereof, to vehicles in the vicinity of the event.

Figure 1:
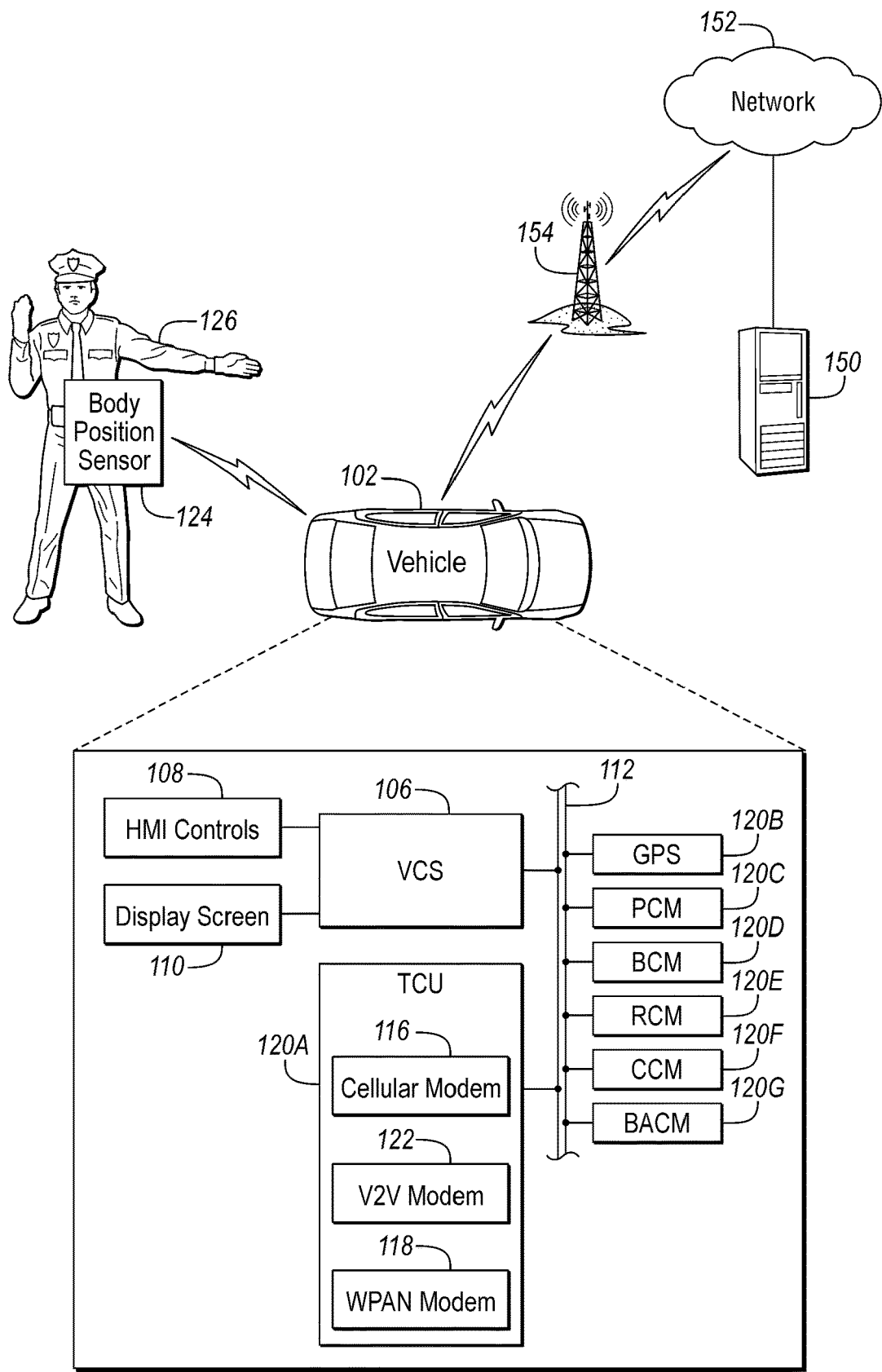
FIG. 1 is a schematic of a vehicle communications system and an event responder in communication with the vehicle.

FIG. 1 illustrates an example vehicle 102 implementing controllers to communicate with a remote server 150 and a gesture recognition device 124. The communication may include establishing an audible connection between the responder and the vehicles. The vehicle 102 may include a vehicle computing system (VCS) 106 configured to communicate using a telematics control unit (TCU) 120-A over a wide-area network 152 (e.g., cellular, Wi-Fi) and network infrastructure 154 using a cellular modem 116. The TCU 120-A may include a vehicle-to-vehicle (V2V) modem 122 (e.g., DSRC, IEEE 802.11p, VANET) to create a V2V network. The TCU 120-A may include a wireless personal area network (WPAN) modem 118 (e.g., Wireless USB, BLUETOOTH, Z WAVE, ZIGBEE, Body Area Network) to communicate with periphery devices such as a body position sensor 124. The system also includes a vehicle data server 150 configured to send and receive route information between vehicles 102, event responders 126, mobile devices, and other entities. The vehicle data server 150 may receive, send, and aggregate vehicle routes affected by the event. The vehicle data server 150 may perform recognition of raw gesture data to determine route changes desired by the event responder 126. The body position sensor 124, vehicle 102 of the responder 126, or vehicles 102 near the event may be configured to determine the gesture or transmit gesture data to the server 150. While an example system is shown in FIG. 1, the example components as illustrated are not intended to be limiting. Indeed, the system may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The VCS 106 may be configured to support voice command and BLUETOOTH interfaces with the driver and driver carry-on devices, receive user input via various buttons or other controls, and provide vehicle status information to a driver or other vehicle 102 occupants. An example VCS 106 may be the SYNC system provided by FORD MOTOR COMPANY of Dearborn, Mich.

The VCS 106 may further include various types of computing apparatus in support of performance of the functions of the VCS 106 described herein. In an example, the VCS 106 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The VCS 106 may be configured to communicate with mobile devices 124 of the vehicle occupants. The WPAN modem 118 may be configured to communicate with various types of portable computing devices, such as cellular phones, tablet computers, smart watches, laptop computers, portable music players, or other devices capable of communication with the VCS 106.

The VCS 106 may also receive input from human-machine interface (HMI) controls 108 configured to provide for occupant interaction with the vehicle 102. For instance, the VCS 106 may interface with one or more buttons or other HMI controls 108 configured to invoke functions on the VCS 106 (e.g., steering wheel audio buttons, a push-to-talk button, instrument panel controls, etc.). The VCS 106 may also drive or otherwise communicate with one or more displays 110 configured to provide visual output to vehicle occupants, e.g., by way of a video controller. In some cases, the display 110 may be a touch screen further configured to receive user touch input via the video controller, while in other cases the display 110 may be a display only, without touch input capabilities. In an example, the display 110 may be a head unit display included in a center console area of the vehicle 102 cabin. In another example, the display 110 may be a screen of a gauge cluster of the vehicle 102.

The VCS 106 may be further configured to communicate with other components of the vehicle 102 via one or more in-vehicle networks 112 or vehicle buses 112. The in-vehicle networks 112 may include one or more of a vehicle controller area network (CAN), an Ethernet network, and a media oriented system transfer (MOST), as some examples. The in-vehicle networks 112 may allow the VCS 106 to communicate with other vehicle 102 systems, such as a vehicle modem of the TCU 120-A (which may not be present in some configurations), a global positioning system (GPS) module 120-B configured to provide current vehicle 102 location and heading information, and various other vehicle ECUs configured to cooperate with the VCS 106. As some non-limiting possibilities, the vehicle ECUs may include a powertrain control module (PCM) 120-C configured to provide control of engine operating components (e.g., idle control components, fuel delivery components, emissions control components, etc.) and monitoring of engine operating components (e.g., status of engine diagnostic codes); a body control module (BCM) 120-D configured to manage various power control functions such as exterior lighting, interior lighting, keyless entry, remote start, and point of access status verification (e.g., closure status of the hood, doors and/or trunk of the vehicle 102); a radio transceiver module (RCM) 120-E configured to communicate with key fobs or other local vehicle 102 devices; a climate control management (CCM) 120-F module configured to provide control and monitoring of heating and cooling system components (e.g., compressor clutch and blower fan control, temperature sensor information, etc.); and a battery control module (BACM) 120-G configured to monitor the state of charge or other parameters of the battery of the vehicle 102.

The wide-area network 152 may include one or more interconnected communication networks such as the Internet, a cable television distribution network, a satellite link network, a local area network, a wide area network, and a telephone network, as some non-limiting examples. Using an embedded modem 116 of the VCS 106, the vehicle 102 may be able to send outgoing data from the vehicle 102 to network destinations on the wide-area network 152, and receive incoming data to the vehicle 102 from network destinations on the wide-area network 152. The vehicle may also send and receive data from the V2V modem 122 or the WPAN modem 118. It should be appreciated that any of the communicated information disclosed herein may be provided by any combination of processors located internally or externally with respect to the vehicle and transmitted using any combination of networking protocols. The processing may be distributed throughout vehicles 102 in the vicinity of the event or performed on a backend server 150. The vehicle 102 may include various communication mediums and methods to distribute vehicle path information among all vehicles, autonomous and non-autonomous, affected by the event. For example, the vehicles 102 may form an ad-hoc, distributed network to distribute processing of the gesture or path information. The vehicles 102 may form a distributed network to communicate detour instructions and travel paths among one another. The vehicles 102 may cooperatively determine rejection rates or altered travel paths.

The TCU 120-A may include a cellular modem or other network transceiver configured to facilitate communication over the wide-area network 152 between the vehicle 102 and other devices of the system. In an example, the VCS 106 may be configured to access the communications features of the TCU 120-A by communicating with the TCU 120-A over a vehicle bus 112. As some examples, the vehicle bus may include a controller area network (CAN) bus, an Ethernet bus, or a MOST bus. In other examples, the VCS 106 may access the wide-area network 152 using the communications services of the mobile device. In an example, the VCS 106 may communicate with the mobile device over a local area connect (e.g., BLUETOOTH), and the mobile device, in turn, communicates over the wide-area network 152 using a cellular modem of the mobile device.

Figure 2:
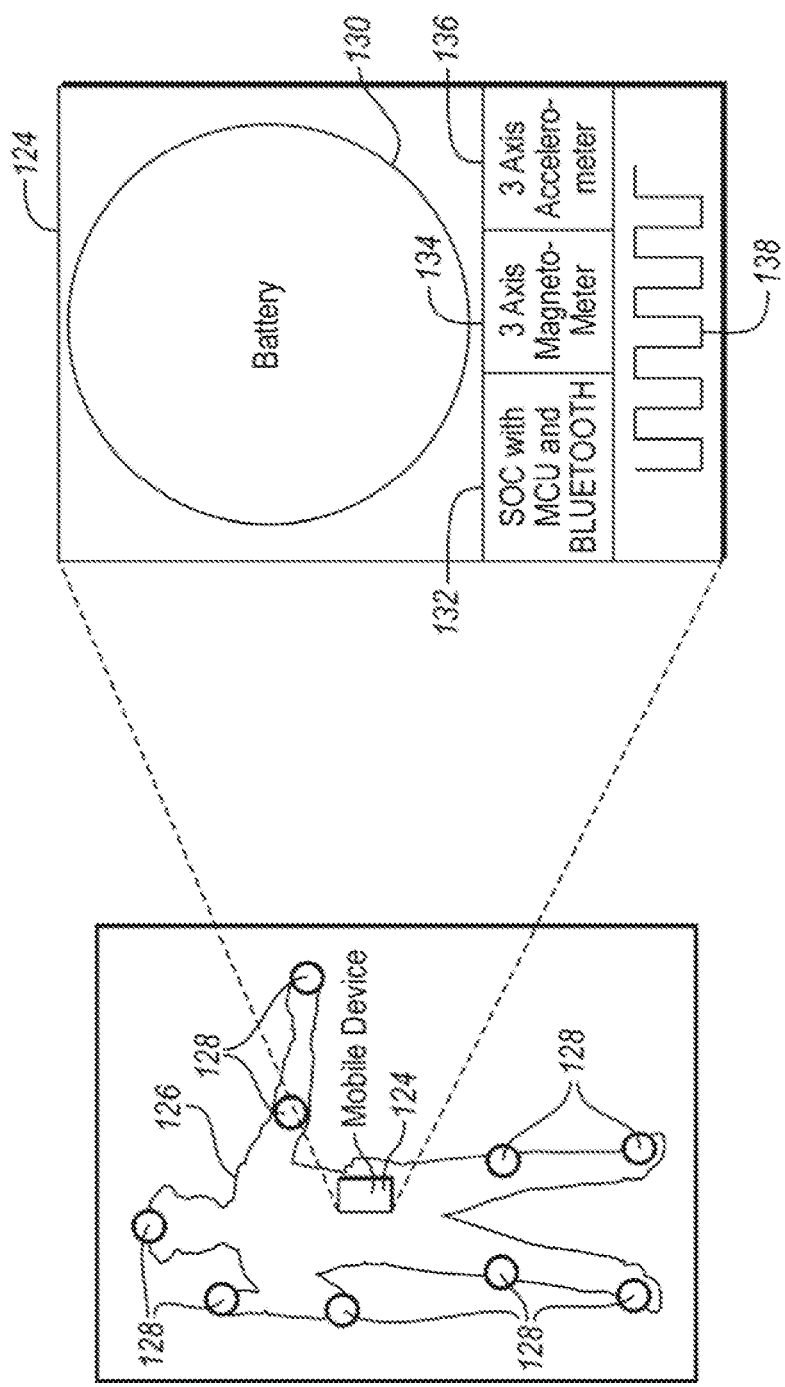
FIG. 2 is a schematic of an event responder including wearable gesture recognition equipment.

Referring to FIG. 2, a gesture recognition or body position sensor 124 is shown on an event responder 126. The event responder has a plurality of position sensors 128 distributed throughout the body. In other embodiments, video or audio recording may be used to determine directional information from the responder 126. The body position sensor 124 includes a battery 130, a system-on-a-chip (SOC) 132, a three-axis magnetometer 134, a three-axis accelerometer 136, and an antenna 138. The body position sensor 124 may be configured to collect information from the plurality of sensors 128. The information may be passed to the network 152 or vehicle ad-hoc network (DSRC) for gesture recognition. The body position sensor 124 may send raw data from each of the sensors. The body position sensor 124 may also send recognized gestures. The magnetometer 134 and accelerometer 136 may also be distributed to the individual sensors 128. The sensors may communicate with the SOC 132 over a wireless or wired connection.

Figure 3:
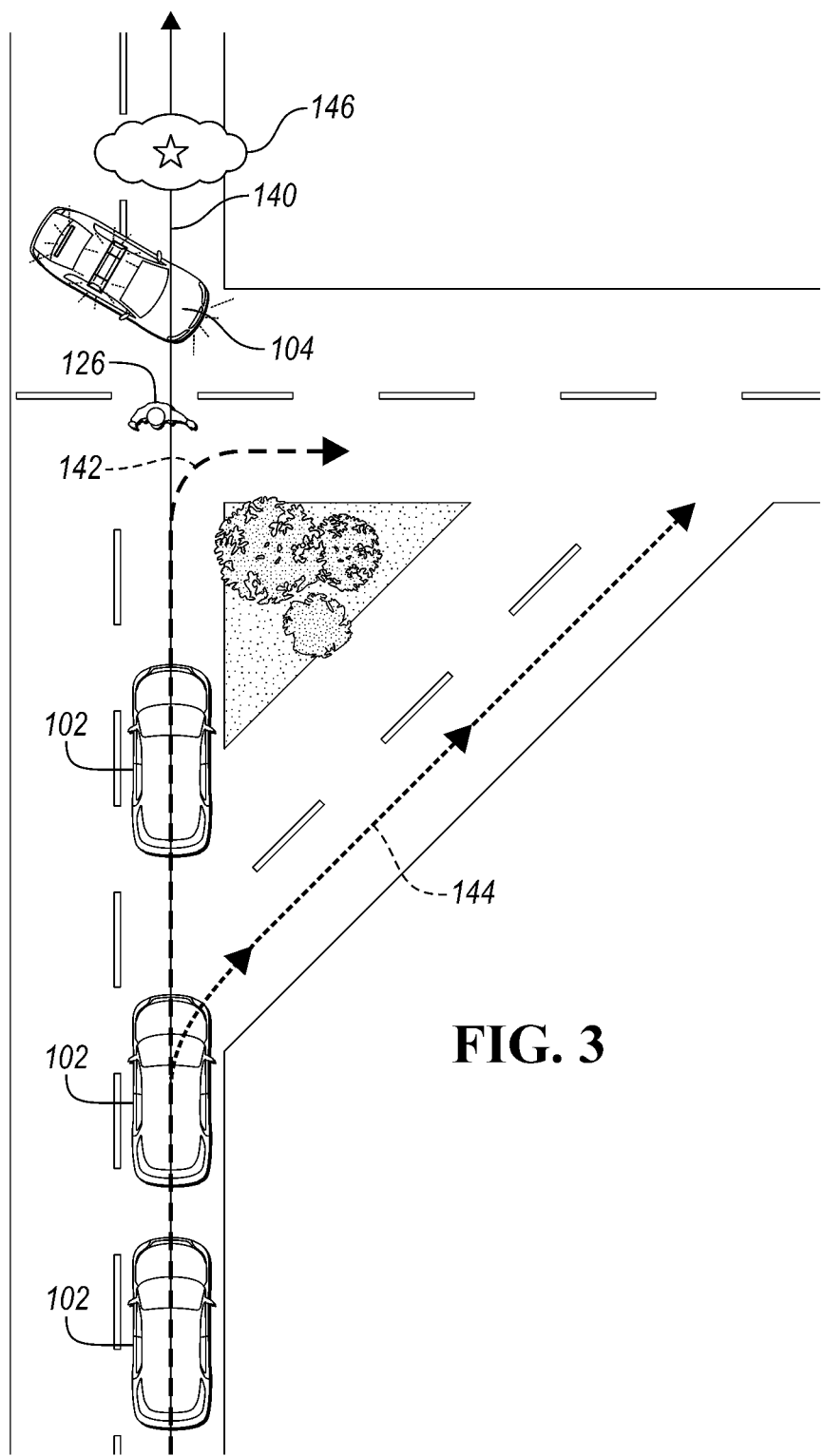
FIG. 3 is an overhead view of travel paths associated with vehicles in the vicinity of an event location.

Referring to FIG. 3, multiple travel paths 140, 142, 144 are shown for vehicles 102. The responder vehicle 104 is stopped along the vehicle 102 travel path 140 due to an event 146. The server 150 or vehicles 102 may be notified of the event 146 by the responder 126, the responder vehicle 104, or another means. The event responder 126 directs the oncoming vehicles 102 to follow detour 142, which includes a travel path that avoids the location of the event. The detour 142 may be sent to the server 150 and disseminated to vehicles 102 in the vicinity of the event or affected by the event to ensure the detour 142 is followed. For autonomous vehicles, the server 150 may direct the autonomous vehicles to follow the detour 142, which is determined based on the event received by the server 150. The server 150 may also take into consideration gesture information sent to the server 150.

Some oncoming vehicles 102 may prefer a different route 144, which is a shortcut that may bypass additional traffic caused by the event 146. The vehicles 102 may communicate the proposed vehicle routes 142 and 144 to the server 150. The routes 142, 144 are received by the server 150. The server 150 then aggregates and assesses the routes 142, 144 to determine whether a substantial portion of the vehicles are taking the alternative route 144, the route 144 different than the travel path 142 received from vehicles 102. A threshold may be reached where a substantial portion of the routes 142, 144 received by the server 150 are different than the route directed by the event responder 126. Instead of continuing to send the original travel path 142, the server may begin sending a travel path update including the proposed route 144. If the vehicles 102 are autonomous, the vehicles 102 may be automatically directed to follow the updated route 144. The proposed vehicle routes 144 may include turns, U-turns, or other directional changes. The proposed vehicle routes 144 could also include lane changes, speed changes, or other nondirectional changes. Meaning, different events may warrant various magnitudes of detour 142. A lane change to avoid an accident may be considered a detour 142. A lane change or speed change to avoid a stopped emergency vehicle 104 may be considered a detour 142. In any of these circumstances, other vehicles 102 may submit proposed routes to the server 150, indicating a different course is intended.

Although a recognized gesture of a responder 126 to the event 146 may direct vehicles 102 to follow a detour 142, vehicles 102 may be directed by machine learning performed at the server 150. For example, the server 150 may recognize that a vehicle route 140 interferes with an event 146. The server 150 may provide the vehicle 102 with a detour 142 without indication from an event responder 126. The recognized gesture may indicate various changes in response to the event. For example, the gesture may indicate that a turn is required. The gesture may also indicate that vehicles 102 approaching the event 146 should slow down.

The server 150 may provide the update in response to the aggregate rejection rate of the detour 142 exceeding a predetermined value. The predetermined value may be a percentage of responses received. For example, the vehicles 102 may provide explicit rejection (e.g., yes or no). The vehicles 102 may also directly provide a proposed route 144. The server 150 may be configured to determine whether the proposed route is substantially different from the detour 142. The difference may be based on a variety of factors (e.g., length of proposed route, length of proposed differences, duration of proposed route, location of endpoint, distance between points on each of the routes). In response to receiving multiple proposed routes 144, the server 150 may update the travel path 142 with the highest occurring proposed route 144. The server 150 may update the travel path 142 with the proposed route 144 having the shortest duration.

The server 150 may determine that the proposed route 144 is preferred and update the detour 142 when the aggregate rejection rate exceeds 30%. If the proposed routes 144 received vary, the update may include the proposed route 144 that is the most common (e.g., the statistical mode). The server 150 may also notify the responder 126 whenever a vehicle 102 rejects the detour 142. For example, the responder 126 may receive a notification including the proposed route 144 and the make and model of a vehicle 102 that has rejected instructions indicated by the gesture. The server 150 may notify the responder when the number of rejections exceeds a threshold value different from the threshold associated with the update to the travel path (e.g., 20% instead of 30%). The server 150 may automatically connect the responder 126 with a vehicle 102 passenger to communicate the cause of rejection. For example, the vehicle 102 passenger may be interested in notifying the responder 126 that the directions given are invalid or unsafe.

Figure 4:
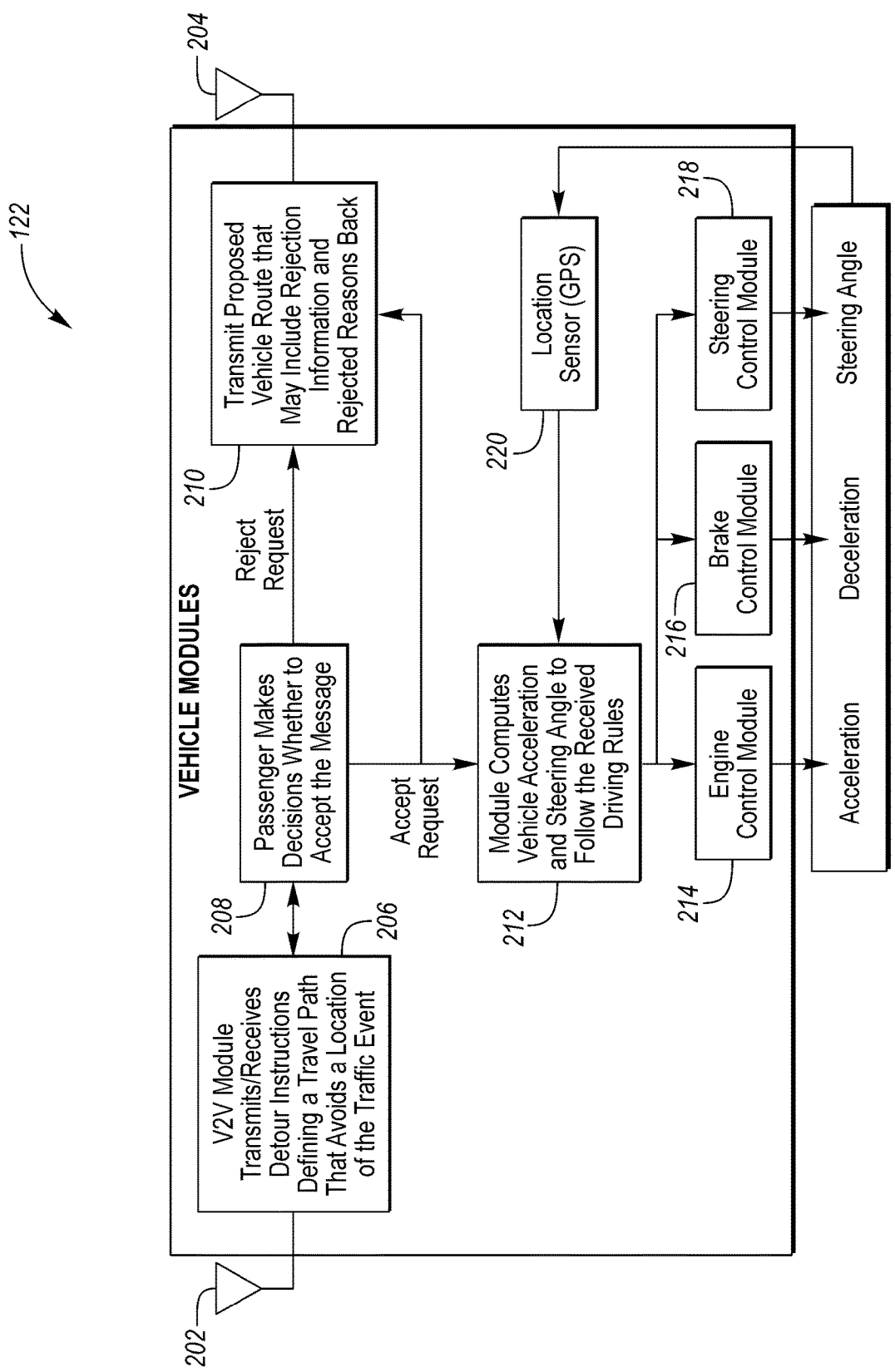
FIG. 4 is a schematic of a vehicle-to-vehicle communication system.

Referring to FIG. 4, a V2V communications module 122 is shown. The V2V module 122 may be similar to other communications modules of the vehicle 102, including cellular or wireless internet connection. It should be appreciated that the vehicles 102 connected through V2V may function as a distributed server to determine the detour 142 and whether to update the detour 142 using the proposed path 144. In one embodiment, the vehicles 102 may share collected data with one another as soon as each vehicle is within wireless range and in the vicinity of the event. The V2V receiver 202 collects transmitted data from other vehicles 102 within wireless range. In function 206, the V2V module transmits and receives detour instructions defining a travel path that avoids a location of the traffic event. The passenger may accept or reject, explicitly, whether to take the detour 142 in function 208. The passenger may make the selection on the HMI 108 or display screen 110 of the vehicle. The passenger may also select a proposed route 144 from a selection of generated or self-defined routes. The proposed route, whether accepted or rejected is sent from the transmitting end 204. If the detour 142 is accepted, the vehicle 102 computes vehicle acceleration and steering angle to follow the path 142 that avoids the event. The vehicle 102 may use an engine control module 214, brake control module 216, steering control module 218, and location sensors 220 to follow the desired route. In function 210, the proposed vehicle route that may include rejection information and rejected reasons back is transmitted. In function 212, a module computes a vehicle acceleration and steering angle to follow the received driving rules.

Figure 5:
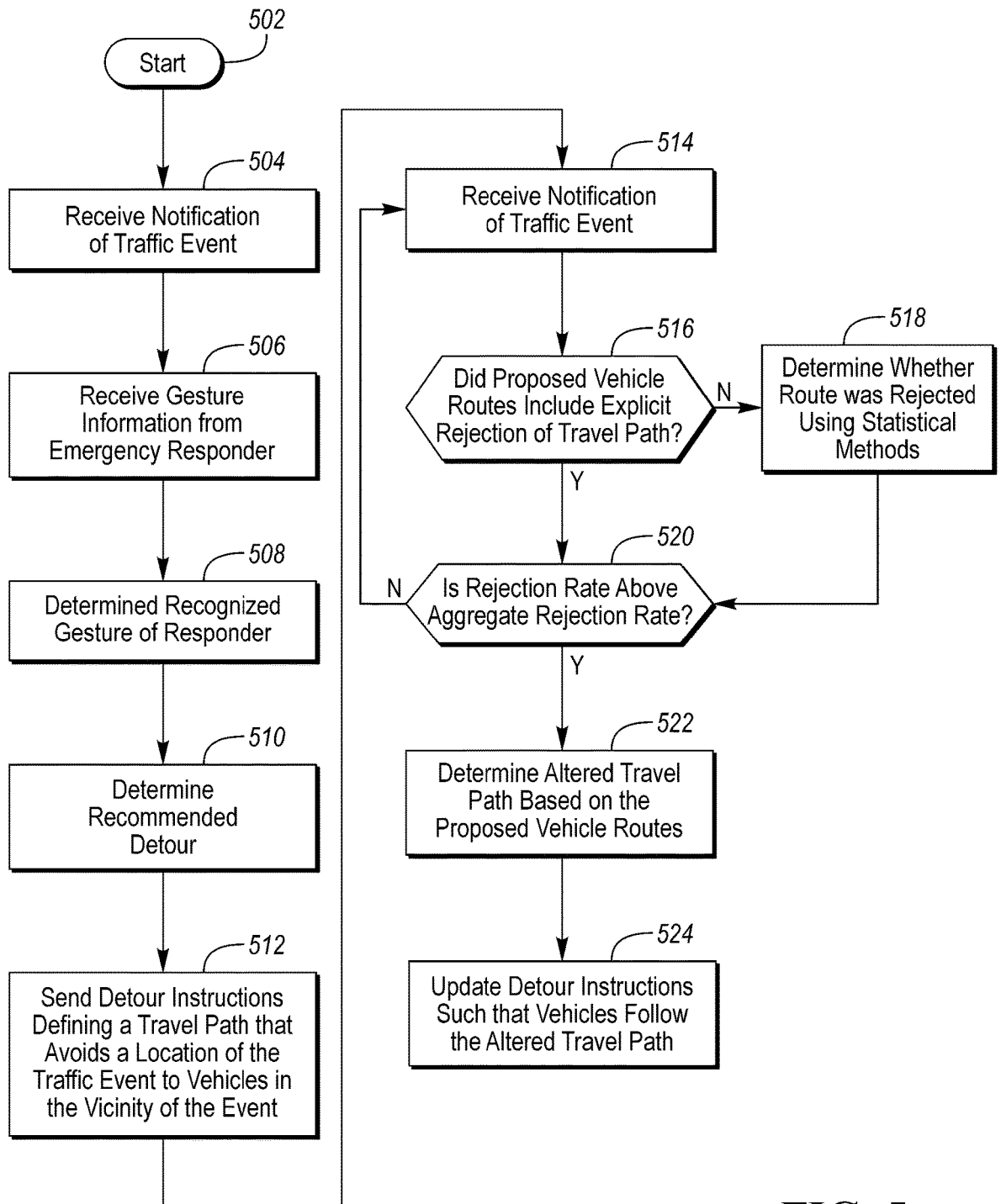
FIG. 5 is a flow chart of an apparatus configured to communicate with vehicles and event responders during an event.

Referring to FIG. 5, an algorithm is shown. It should be appreciated that any combination of vehicles 102, 104, servers 150, or other apparatuses may perform any and all of the steps in this algorithm. The algorithm begins with step 502. In step 504, a notification of a traffic event 140 is received. In step 506, gesture information may be received, as transmitted from the body position sensor 124 to the responder's vehicle 104, which is then disseminated to the server 150 and vehicles 102. The gesture may be recognized at the responder's vehicle 104, server 150, or vehicles 102 in step 508. In step 510, a recommended detour 142 is determined. In step 512, detour instructions are sent or calculated defining a travel path 142 that avoids a location of the traffic event 140 to vehicles 102 in the vicinity of the event 140. The vicinity may be a geographic area, radius, or any vehicle 102 anticipated to be affected by the event 140 and detour 142. In step 514, the proposed vehicle routes 514 are received. In step 516, a determination is made as to whether the routes received included an explicit rejection of the travel path 142. If the routes did not include an explicit rejection or acceptance, the rejection or acceptance may be determined, using the methods described above, in step 518. A determination of whether the rejection rate is above the predetermined value is performed in step 520. In step 522 the best-altered path, which may be path 144 or the best path determined from the aggregated proposed paths 144 received, is determined. In step 524, the detour instructions are updated such that the vehicles 102 follow the alter travel path. It should be appreciated that autonomous vehicles may be controlled locally or remotely to follow the altered travel path.

Additionally, the vehicles 102 may be guided to pass through the event 140 based on real-time incoming traffic data. For example, the number of vehicles 102 approaching the event 140 and the speed of each vehicle 102. Meaning, networks of queues can predict the time that each vehicle 102 arrives to the event 140. Signals may be provided to the incoming vehicles 102 regarding vehicle speed. A queuing method may be used to predict the number vehicles affected or the length of the accident zone, which may affect the detour 142 suggested.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An apparatus comprising:
  a processor configured to,
    responsive to receiving notification of an event, send detour instructions based on a recognized gesture from sensors worn by a responder to the event defining a travel path that avoids the event,
    receive proposed vehicle routes from vehicles in the vicinity of the event, the proposed vehicle routes being different than the travel path, and
  responsive to receiving the proposed vehicle routes and responsive to an aggregate rejection rate of the travel path being above a predetermined value, update the detour instructions to alter the travel path based on the proposed vehicle routes.

2. The apparatus of claim 1, wherein the gesture is indicative of a turn.

3. The apparatus of claim 1, wherein the processor is configured to receive an explicit rejection of the travel path from at least one of the vehicles in the vicinity of the event.

4. The apparatus of claim 3, wherein the aggregate rejection rate is derived from explicit rejection.

5. The apparatus of claim 1, wherein the predetermined value is 20%.

6. The apparatus of claim 1, wherein the proposed vehicle routes shorten overall travel time with respect to the travel path.

7. The apparatus of claim 1, wherein the event is an accident.

8. The apparatus of claim 1, wherein the event is a roadway hazard.

9. The apparatus of claim 1, wherein the travel path includes a route that avoids the event via a lane change.

10. A method comprising:
  responsive to receiving notification of a traffic event, sending detour instructions based on a recognized gesture from sensors worn by a responder to the traffic event and defining a travel path that avoids a location of the traffic event, and
  receive proposed vehicle routes from vehicles in the vicinity of the event, the proposed vehicle routes being different than the travel path, and
  responsive to receiving the proposed vehicle routes and responsive to an aggregate rejection rate of the travel path being above a predetermined value, updating the detour instructions to alter the travel path based on the proposed vehicle routes such that autonomous vehicles operate to follow the altered travel path.

11. The method of claim 10, further comprising receiving an explicit rejection of the travel path from at least one of the vehicles in the vicinity of the event.

12. The method of claim 10, wherein the aggregate rejection rate is derived from differences between the proposed vehicle routes and the travel path.

13. A method comprising:
responsive to receiving notification of a traffic event, sending detour instructions, based on a recognized gesture of a responder to the traffic event, defining a travel path that avoids a location of the traffic event, and
responsive to proposed vehicle routes including an explicit rejection of the travel path received from vehicles in a vicinity of the event and responsive to an aggregate rejection rate derived from differences between the proposed vehicle route and the travel path being above a predetermined value, updating the detour instructions to alter the travel path based on the proposed vehicle routes such that autonomous vehicles operate to follow the altered travel path.

* * * * *